United States Patent [19]
Matsuda et al.

[11] Patent Number: 5,743,612
[45] Date of Patent: Apr. 28, 1998

[54] LIQUID CRYSTAL PROJECTOR

[75] Inventors: Yutaka Matsuda, Fujisawa; Nobuhiro Konuma; Kenji Sato, both of Yokohama, all of Japan

[73] Assignee: Hitachi, Ltd, Tokyo, Japan

[21] Appl. No.: 743,644

[22] Filed: Nov. 4, 1996

[30] Foreign Application Priority Data

Nov. 10, 1995 [JP] Japan .................................. 7-292459
Nov. 10, 1995 [JP] Japan .................................. 7-292460

[51] Int. Cl.⁶ .................................................. G03B 21/14
[52] U.S. Cl. ................................. 353/97; 353/31; 353/94
[58] Field of Search ................................. 353/31, 37, 57, 353/61, 85, 87, 88, 94, 97, 98, 99; 349/5, 8

[56] References Cited

U.S. PATENT DOCUMENTS

| | | | |
|---|---|---|---|
| 4,552,441 | 11/1985 | Dewey | 353/99 |
| 4,925,295 | 5/1990 | Ogawa et al. | 353/57 |
| 5,287,132 | 2/1994 | Suzuki et al. | 353/57 |
| 5,300,966 | 4/1994 | Uehra et al. | 353/99 |
| 5,313,234 | 5/1994 | Edmonson et al. | 353/61 |
| 5,379,083 | 1/1995 | Tomita | 353/122 |
| 5,404,175 | 4/1995 | Nagae et al. | 348/751 |
| 5,452,128 | 9/1995 | Kimura | 349/9 |
| 5,621,486 | 4/1997 | Doany et al. | 353/37 |
| 5,648,860 | 7/1997 | Ooi et al. | 353/31 |
| 5,658,060 | 8/1997 | Dove | 353/31 |

FOREIGN PATENT DOCUMENTS

| | | | |
|---|---|---|---|
| 2130542 | 5/1990 | Japan | 353/52 |
| A-4-68689 | 3/1992 | Japan . | |
| A-4-194921 | 7/1992 | Japan . | |

*Primary Examiner*—William Dowling
*Attorney, Agent, or Firm*—Bardehle, Pagenberg, Dost, Altenburg, Frohiwitter, Geissler

[57] ABSTRACT

In a liquid crystal projector using a reflective and scattering or reflective type liquid crystal panel, a plurality of light sources are used, thereby securing sufficient brightness of an image, increasing the F-number of a projection lens, and miniaturizing and lightening the projector. A light source is arranged right next to the projection lens and an exhaust port is arranged on the front face of the projector, thereby preventing hot heat discharged from the exhaust port from being discharged toward peripheral equipment or the operator.

14 Claims, 14 Drawing Sheets

LIQUID CRYSTAL PROJECTOR

BACKGROUND OF THE INVENTION

The present invention relates to a liquid crystal projector in which an illumination light from a light source is irradiated onto a liquid crystal panel, especially, a reflective and scattering type liquid crystal panel, and an image light which was obtained by modulating the illumination light by the liquid crystal panel is enlargedly projected onto a screen by a projection lens.

For example, a system disclosed in FIG. 1 of Japanese Patent Application Laid-Open No. 4-194921 has been conventionally known as a liquid crystal projector using the reflective and scattering type liquid crystal panel. The system comprises an aperture diaphragm (corresponding to the shielding mask 7), a mirror (corresponding to the reflecting mirror 8), a convex lens (corresponding to the condenser lens 6), and reflective and scattering type liquid crystal panels (corresponding to the reflective and scattering type liquid crystal device 5R for red, the reflective and scattering type liquid crystal device 5G for green, and the reflective and scattering type liquid crystal device 5B for blue). In the system, an illumination light from a light source is irradiated onto the liquid crystal panels via the mirror and the convex lens, and is modulated to an image light and is reflected by the liquid crystal panels. The reflected image light is enlargedly projected via the convex lens and the aperture diaphragm onto a screen by a projection lens.

FIG. 9 is a schematic diagram for explaining the basic operation of a liquid crystal projector using a reflecting and scattering type liquid crystal panel. An illumination light 46 emitted from a light source 41 passes through an aperture diaphragm 42 on a light-incoming side and enters a reflecting and scattering type liquid crystal panel 43. The light is reflected by the liquid crystal panel 43, transmitted through an aperture diaphragm 44 for a projection lens, and enlargedly projected onto a screen (not shown) by a projection lens 45.

In the above optical system, picture elements of the liquid crystal panel 43 diffuse the entering light according to a voltage to be applied. A normally-reflected light 47 indicated by a solid line shows a reflection light which is not diffused. A diffused reflection light 48 indicated by a broken line shows a reflection light which is diffused by the liquid crystal panel. Most of the normally-reflected lights 47 pass through the aperture diaphragm 44 and arrive at the screen via the projection lens 45. However, since most of the diffused reflection lights 48 are shielded by the aperture diaphragm 44, a point on the screen, which corresponds to a picture element which diffused the light is dark.

In the liquid crystal projector using the reflecting and scattering type liquid crystal panel, by controlling the degree of diffusion of the light reflection, the illumination light from the light source is converted to the image light.

Since no polarizing filter is used, the liquid crystal projector with such a structure can obtain brighter and larger image on a screen than an image of a liquid crystal projector using a TN (twisted nematic) type liquid crystal panel. Since the reflecting type liquid crystal panel is used, the numerical aperture of each picture element can be set larger than that of a transmitting type liquid crystal panel, so that a brighter image can be obtained.

Further, since optical paths in the optical system are bent in the reflecting type liquid crystal panel, the optical system is smaller than that of a projector using the transmitting type liquid crystal panel.

However, it is difficult to obtain a brighter image by enlarging the areas of the aperture diaphragm and the mirror in the conventional reflective and scattering type liquid crystal panel with the above structure.

When the areas of the aperture diaphragm and the mirror are enlarged, although a bright image can be obtained, a problem of deterioration in contrast occurs.

This will be further described hereinbelow with reference to drawings.

FIG. 10 is a schematic diagram of a side face of an optical system of a conventional reflective and scattering type liquid crystal projector. An illumination light 61 emitted from a metal halide lamp 51 as a light source is converted to an almost parallel light by a condenser reflector 52 and is condensed via a condenser lens 53 onto a mirror 54 (corresponding to the aperture diaphragm 42 on the light incoming side in FIG. 9). After being reflected, the light enters a dichroic prism 56 via a plane-convex lens 55. The illumination light 61 is separated by the dichroic prism 56 into a red light 62r, a blue light 62b, and a green light 62g. The lights 62r, 62b, and 62g are modulated to image lights by reflecting and scattering type liquid crystal panels 57r, 57b, and 57g, respectively. Then, a red image light 63r, a blue image light 63b, and a green image light 63g are reflected. The image lights 63r, 63b, and 63g are photocolorsynthesized by the dichroic prism 56, thereby deriving an outgoing image light 64. The outgoing image light 64 enters a projection lens 59 through the plane-convex lens 55 and an aperture diaphragm 58 and is projected onto a screen (not shown).

The mirror 54 and the aperture diaphragm 58 are positioned within a focal plane of the projection lens 59 and are arranged so as to be adjacent in the vertical direction with respect to the optical axis 19 of the projection lens 59 as a center. Thus, the projection lens 59 effectively takes in the image lights 63r, 63b, and 63g which are normally reflected by the liquid crystal panels 57r, 57b, and 57g.

FIG. 11 is a front view of a focal plane 60 of the projection lens 59 of the conventional liquid crystal projector shown in FIG. 10. As shown in FIG. 11, the mirror 54 is arranged on the upper side of the optical axis 19 of the focal plane 60 and the aperture diaphragm 58 is arranged on the lower side of the optical axis 19. Since the condenser reflector 52 as a light source has an ellipsoid of revolution or paraboloid of revolution, the aperture diaphragm 58 has an almost circle shape and the mirror 54 has a square shape. When the aperture diaphragm 58 and the mirror 54 are arranged in the vertical direction, the actually-valid area of the aperture diaphragm 58 is about 25% for the focal plane 60 of the projection lens 59. For example, when the area of the aperture diaphragm 58 is set so that the F-number for the projection lens is equal to 4 (hereinlater, written as F4), the F-number of the focal plane 60 of the projection lens 59 has to correspond to F2.

As mentioned above, since the area necessary for the focal plane 60 of the projection lens 59 is large for the aperture diaphragm 58 in the conventional optical system, designing of the projection lens is difficult, the lens construction is complicated, and problems such as increase in volume and weight, and the like are caused.

The second problem relates to contrast of an image.

In the optical system using the reflecting and scattering type liquid crystal panel, the smaller the areas of the mirror on the light source side and the aperture diaphragm on the projection lens side are, the less the diffused reflection light passes through the aperture diaphragm on the projection lens side. Consequently, the brightness on the screen when the light is diffused is reduced and the contrast of an image is improved.

It is, however, difficult to make a perfect parallel light since a light emitting unit of the light source is not actually a perfect-point sized light source but has a predetermined size. Therefore, when the area of the aperture diaphragm on the light-incoming side is reduced, the light amount itself which enters the liquid crystal panel is reduced and the brightness is accordingly reduced.

In the conventional optical system, the mirror on the light-incoming side has the area corresponding to that the F-number of the projection lens is equal to F11 to F4 in order to secure the light amount which enters the liquid crystal panel. In order to obtain the maximum value of the brightness on the screen, it is necessary to set the area of the aperture diaphragm to a size so that the F-number is equal to F5.6 to F4. The contrast of the image ranges from (20:1) to (40:1) in this instance. The absolute value of the contrast is inferior to a value which ranges from (80:1) to (200:1) when the F-number is increased from F8 to F11.

In case of the optical system in which the brightness and the contrast of the screen are changed almost in the inverse proportional manner, the optimum specifications are changed according to an environment in which the image is observed.

Table 1 shows an example of effective contrast when the image of the liquid crystal projector is observed in a light room and a dark room.

TABLE 1

| Performance of the main body | | | Effective value of contrast * | |
|---|---|---|---|---|
| Brightness | | Contrast | Room with | Room with |
| All white display | All black display | Contrast | lightness of 200 lx | lightness of 25 lx |
| 4000 lx | 100 lx | 40:1 | 14:1 | 32:1 |
| 2000 lx | 25 lx | 80:1 | 10:1 | 41:1 |

* Method of calculating effective value of the contrast
Effective value = (all white display + lightness of the room)/(all black display + lightness of the room)

As shown in table 1, in a light room where intensity of illumination is 200 lx or more, even if the contrast is low, a bright image is preferred since the contrast is actually looked high. In a dark room where the intensity of illumination is low or in a pitch-dark room, an image having high contrast is preferred rather than brightness. The liquid crystal projector in which the brightness and the contrast are inverse proportional has a problem such that the specification has to be changed according to the environment in which the image is observed.

In order to reconcile the contrast and brightness each other, a method of increasing an output of a lamp of a light source is considered to improve the brightness without enlarging the areas of the mirror and the aperture diaphragm. However, when the output of the lamp is increased, the light emitting unit of the lamp becomes large, so that it is difficult to effectively condense the illumination light onto the mirror. Much improvement in brightness cannot be expected and a new problem that the life of the lamp is shortened is caused.

Further, the liquid crystal projector using the conventional liquid crystal panel has another problem regarding the position of an exhaust port from which residual heat in the set is discharged.

The problem is naturally caused also in the case where the above-mentioned reflective and scattering type liquid crystal panel is used. The problem occurs not only when the reflective and scattering the liquid crystal panel is used, but also when liquid crystal panels in other types (for example, a transmitting type liquid crystal panel) are used.

The problem will now be explained with the conventional technique using the transmitting type liquid crystal panel.

For example, a system shown in FIG. 1 of Japanese Patent Application Laid-Open No. 4-68689 is known as a conventional liquid crystal projector. The system comprises a light source (corresponding to the light source 1), dichroic mirrors (corresponding to the dichroic mirrors 10 and 14), transmitting type liquid crystal panels (corresponding to the liquid crystal panels 12a to 12c), and a projection lens. An illumination light emitted from the light source is separated to illumination lights of the three primary colors of red, blue, and green by the dichroic mirrors. The illumination lights are transmitted through the liquid crystal panels, respectively, and modulated into image lights. The image lights of red, blue, and green are again photocolorsynthesized by the dichroic mirrors and are enlargedly projected onto a screen by the projection lens.

FIG. 15 is a side view of the optical system of a conventional liquid crystal projector. An illumination light 141 emitted from a metal halide lamp 121 as a light source is reflected by a condenser reflector 122 for transmitting infrared and ultraviolet rays and is separated into lights of the three primary colors of red, blue, and green by dichroic mirrors 124r, 124b, and 124g via a reflecting mirror 123. After being transmitted through a plane-convex lens 125, the illumination lights are modulated to image lights 142 by transmitting type liquid crystal panels 126r, 126b, and 126g and pass through the panels. The image lights 142 of the three primary colors of red, blue, and green are photocolorsynthesized by dichroic mirrors 114r, 114b, and 114g and are enlargedly projected by a projection lens 129.

Infrared and ultraviolet rays 143 emitted from the metal halide lamp 121 as a light source are transmitted through the infrared and ultraviolet rays transmitting condenser reflector 122 and are absorbed by the inside of a lamp house 130, thereby becoming heat. The heat stuffed inside the lamp house 130 is backwardly discharged from an exhaust port 132 which is positioned on the rear face of the set by an exhaust fan 131.

In the conventional liquid crystal projector, when the light emitting face of the projection lens is set to the front of the set, the light source and the projection lens are positioned on a diagonal line of the set and the light source is located backward in the set. Consequently, the exhaust port from which residual heat from the light source is discharged is arranged on either rear face or right or left side face of the set.

The liquid crystal projector tends to use a metal halide lamp or halogen lamp as a light source which generates high power like 150 W to 400 W in order to realize brightness of an image. A temperature near the lamp house is very high due to the infrared and ultraviolet rays generated by the lamp. When the heat inside the lamp house is discharged, there is a case that the temperature of the exhaust exceeds 40° C. The hot air from the exhaust port is conventionally a problem which cannot be ignored.

First, there is a problem that the hot air is discharged toward the operator or the observer of the image when the liquid crystal projector is used. When the liquid crystal projector is used, the peripheral equipment such as personal computer, VTR, LD, and the like as an apparatus of generating the image signal is often arranged beside or on the back side of the set. In this case, the exhaust port of the liquid crystal projector is positioned adjacent to a sucking port of a cooling device of the peripheral equipment. The hot air from the exhaust port is sucked by the sucking port of the peripheral equipment, so that a problem of a failure of the peripheral equipment due to the heat occurs.

Since the whole lamp house including the light source has high temperature, the liquid crystal panel arranged near the light source in the set is influenced by the heat of the light source, causing deterioration of picture quality.

SUMMARY OF THE INVENTION

In order to solve the drawbacks of a conventional liquid crystal projector, it is an object of the invention to propose a liquid crystal projector having a structure of a compact optical system by which a bright image can be obtained and which prevents a projection lens from being enlarged while securing the areas of a reflecting mirror (hereinlater, simply called a mirror) on a focal plane and an aperture diaphragm by using a plurality of light sources.

It is a second object of the invention to propose a liquid crystal projector having a structure of an optical system by which a pleasant image having excellent contrast is obtained under an environment where an absolute lightness is not required, by turning on only light sources of an optional number among the plurality of light sources.

Another object of the invention is to provide a liquid crystal projector having a structure of an optical system in which the exhaust from the light source of the liquid crystal projector is discharged forwardly, not toward the peripheral equipment and persons.

Further another object of the invention is to provide a liquid crystal projector having a compact structure of an optical system while keeping a stable picture quality by arranging a liquid crystal panel away from a light source, which is easily influenced by heat.

According to the invention, in order to achieve the above objects, a plurality of light sources are used in an optical system and a plurality of mirrors and aperture diaphragms having shapes or sizes which are different in accordance with necessity are arranged for the focal plane of the projection lens. Although the number of light sources is set to at least two, there is a case that the efficiency is not satisfactory when the number of light sources is five or more. Therefore, it is preferable in the invention that the number is two to four. Generally, two light sources are used.

Further, according to the invention, in order to achieve the objects, a set of a mirror and an aperture diaphragm is arranged on an oblique line, and another set of a mirror and an aperture diaphragm are arranged on another oblique line. These two oblique lines perpendicularly cross each other in an X shape. Consequently, the plurality of aperture diaphragms are adjacent in a focal plane.

In order to achieve the second object, in an environment where no absolute brightness is necessary, only light sources of an optional number among a plurality of light sources are turned on, mechanisms for closing aperture diaphragms corresponding to light sources which are not turned on are provided.

With such a structure, the area of the focal plane of the projection lens is reduced, the F-number of the lens is increased, the designing of the lens is facilitated, and the lens is simplified, miniaturized, and lightened.

When no absolute value of brightness is necessary, for example, when images from the liquid crystal projector are observed in a dark room, the light sources of an optional number are turned on and the aperture diaphragms corresponding to the light sources which are not turned on are closed. Thus, the F-number of the aperture diaphragm can be temporarily increased, and an image with high contrast can be obtained. By making the shapes and areas of the plurality of mirrors and aperture diaphragms different, the brightness and contrast can be finely controlled.

In the present invention, a mirror is arranged in an optical path between the light source and the reflective type liquid crystal panel and an aperture diaphragm is arranged in an optical path between the reflective type liquid crystal panel and the projection lens; or an aperture diaphragm is arranged in an optical path between the light source and the reflective type liquid crystal panel; and a mirror is arranged in an optical path between the reflective type liquid crystal panel and the projection lens.

In order to solve the problem regarding the position of the exhaust port, attention is paid to a point that the operator or peripheral equipment is not positioned in front of the liquid crystal projector set, namely, on the optical axis of the outgoing image light. The invention has consequently the structure of an optical system such that the exhaust port from which heat generated from the light source is discharged is arranged on the front face (face on which the light-outgoing face of the projection lens is positioned) of the set. The discharging direction of the exhaust is almost the same as the direction of the image light emitted through the projection lens.

In the projector, if the operator of the projector and the observer of the image stay in front of the set, they block the image light. Consequently, they naturally avoid being in front of the set. Similarly, the peripheral equipment is not also similarly arranged in front of the set. Therefore, with the above-mentioned structure, the problem that the exhaust from the liquid crystal projector is discharged toward the peripheral equipment and persons can be solved.

In order to realize such a structure, and further, to arrange the light source away from the liquid crystal panel in the invention, a reflective type liquid crystal panel is used and the light source can be also arranged right aside of the projecting lens.

DESCRIPTION OF THE PREFERRED EMBODIMENTS (Embodiment 1)

Figure 1:
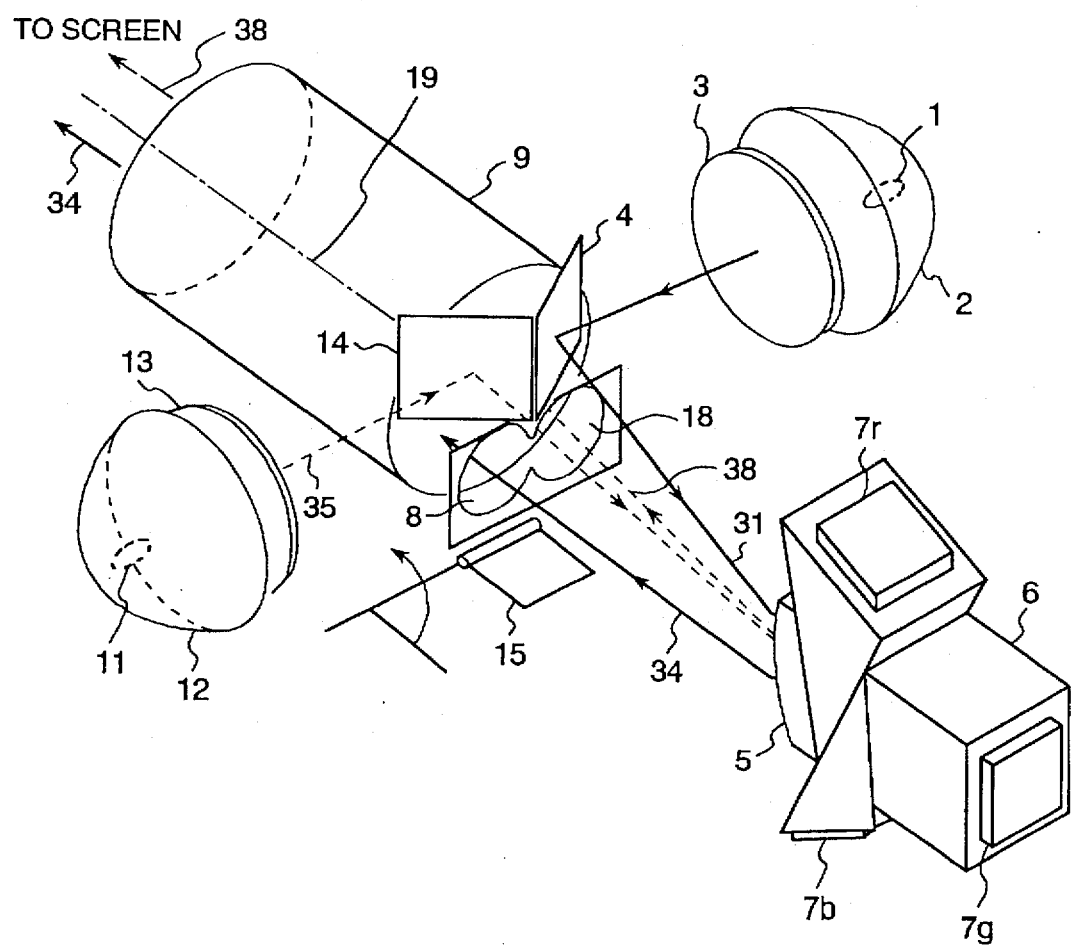
FIG. 1 is a perspective view showing the main components of an optical system of a liquid crystal projector according to a first embodiment of the invention.

FIG. 1 is a perspective view showing the main components of an optical system of a liquid crystal projector according to the first embodiment of the invention. The liquid crystal projector in the embodiment uses two light sources, two mirrors, and two aperture diaphragms. The optical system of the liquid crystal projector in the embodiment uses three liquid crystal panels and a dichroic prism for separating a light into lights of the three primary colors and synthesizing them. For simplicity of explanation, descriptions of the dichroic prism and the separating and synthesizing operations of the three primary colors are omitted with reference to FIGS. 1 and 3. They will be described in detail with reference to FIG. 4.

As shown in FIG. 1, two metal halide lamps 1 and 11 as light sources and condenser reflectors 2 and 12 are arranged so as to face each other. Mirrors 4 and 14 and aperture diaphragms 8 and 18 are adjacently arranged, respectively, on a focal plane of a projection lens 9. The first mirror 4 corresponding to the first metal halide lamp 1 is arranged at the upper right of the focal plane of the projection lens 9. The first aperture diaphragm 8 is disposed at the lower left of the focal plane. The second mirror 14 corresponding to the second metal halide lamp 11 is arranged at the upper left of the focal plane and the second aperture diaphragm 18 is disposed at the lower right. As mentioned above, the optical system of the embodiment has the structure such that two mirrors are adjacently arranged in the upper half of the focal plane and two aperture diaphragms are adjacently arranged in the lower half of the focal plane. One set of the mirror and the aperture diaphragm is arranged on an oblique line and another set of the mirror and the aperture diaphragm is arranged on another oblique line. The oblique lines perpendicularly cross each other in an X shape by using an optical axis 19 as a center. Each of the mirrors 4 and 14 has a rectangle shape in which the ratio of the length of the sides is (1:1.4). It looks like an almost square when it is seen from the front of the focal plane.

Figure 2:
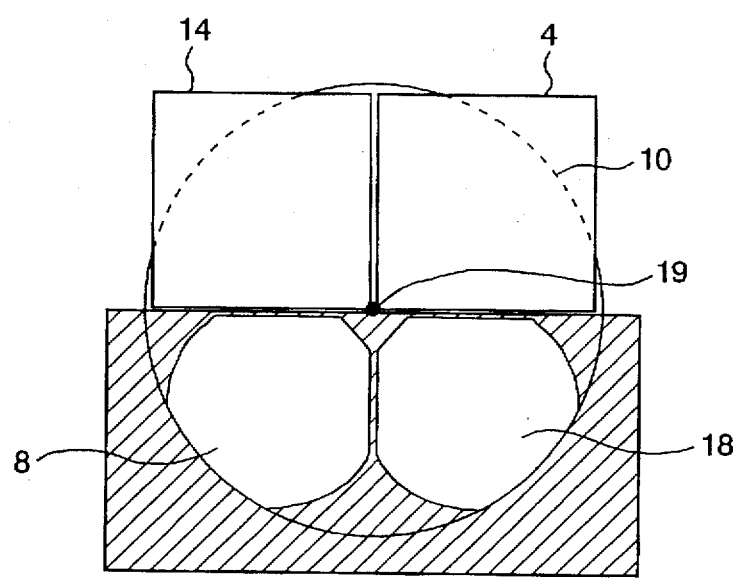
FIG. 2 is a front view of a focal plane of a projection lens of the liquid crystal projector according to the first embodiment of the invention.

A shielding plate 15 for the aperture diaphragm, which is positioned on the lower side of the first aperture diaphragm 8 is turned up around the lower side as a center to close the first aperture diaphragm 8 when only the second metal halide lamp 11 is turned on. FIG. 2 is a front view of a focal plane 10 of the projection lens 9 of the embodiment. In the optical system of the embodiment, the valid radius of the focal plane 10 of the projection lens 9 is 22 mm. The F-number of the projection lens 9 is approximately F2.8. In FIG. 2, each of the aperture diaphragms 8 and 18 has a shape obtained by notching a part of a circle which has the radius of 11 mm. The area of each aperture diaphragm is about 330 mm$^2$ and the effective F-number for the projection lens 9 is about F5.9. Consequently, the aperture diaphragms have the valid area of about total 44% for the area of the focal plane of the projection lens in the optical system. It can be considered that the valid F-number of the projection lens of the optical system is about F4.2 by combining two aperture diaphragms.

Figure 3:
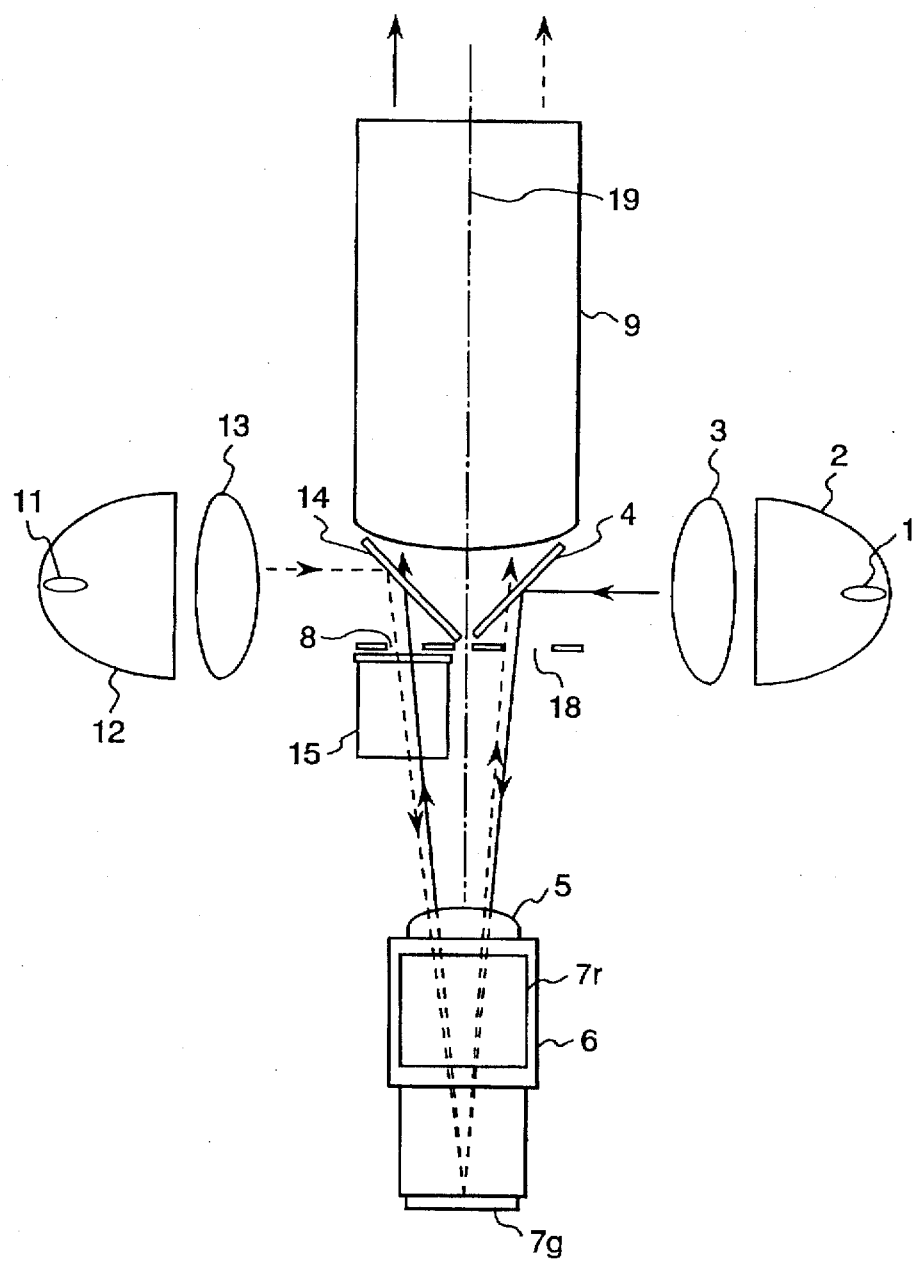
FIG. 3 is a top view showing the main components of the optical system of the liquid crystal projector according to the first embodiment of the invention.

FIG. 3 is a top view of the optical system of the embodiment. As shown in FIG. 3, each of the mirrors 4 and 14 of the optical system of the embodiment is arranged at about 46 degrees to the optical axis 19 of the projection lens 9. The aperture diaphragms 8 and 18 positioned below the mirrors are arranged vertically with respect to the optical axis 19 of the projection lens 9 as a center.

Figure 4:
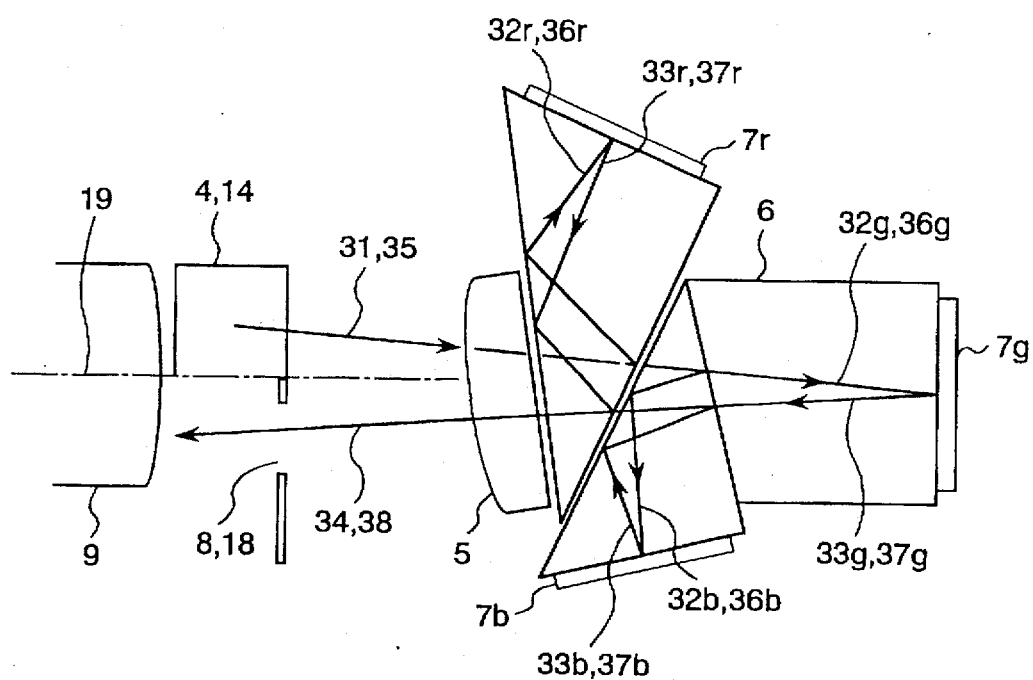
FIG. 4 is a side view showing the main components of the optical system of the liquid crystal projector according to the first embodiment of the invention.

FIG. 4 is a side view of the optical system of the embodiment. In FIG. 4, the metal halide lamps 1 and 11 and the condenser reflectors 2 and 12, which are disposed as if they overlap with the mirrors 4 and 14 when they are seen from the side, are omitted. A dichroic prism 6 is constructed by three prisms and separates a white light coming from the light source into lights of the three primary colors by dichroic films each of which reflects only a light having a specified wavelength. Reflecting and scattering type liquid crystal panels 7r, 7b, and 7g which correspond to red, blue, and green lights, respectively, are attached onto the top face, under face, and rear face of the dichroic prism 6.

The action of the optical system of the embodiment will be briefly explained with reference to FIGS. 1, 3, and 4. An illumination light 31 emitted from the metal halide lamp 1 as a first light source is reflected by the condenser reflector 2. The light 31 is condensed via the condenser lens 3 onto the first mirror 4 positioning at the upper right of the focal plane of the projection lens 9 and is reflected. After that, the light 31 enters the dichroic prism 6 via a plane-convex lens 5. The illumination light 31 is separated into a red light 32r, a blue light 32b, and a green light 32g by the dichroic prism 6. The lights 32r, 32b, and 32g are modulated by the reflecting and scattering type liquid crystal panels 7r, 7b, and 7g into image lights, respectively. Consequently, a red image light 33r, a blue image light 33b, and a green image light 33g are reflected. The image lights 33r, 33b, and 33g are photocolorsynthesized by the dichroic prism 6, thereby deriving an outgoing image light 34.

The outgoing image light 34 enters the projection lens 9 via the plane-convex lens 5 and the first aperture diaphragm 8 which is positioned at the lower left of the focal plane 10 of the projection lens 9 and is enlargedly projected onto a screen (not shown).

An illumination light 35 emitted from the metal halide lamp 11 as a second light source is condensed onto the second mirror 14 via the condenser reflector 12 and the condenser lens 13 in a manner similar to the light emitted from the first light source. After being reflected by the mirror 14, the light 35 enters the dichroic prism 6 via the plane-convex lens 5. The illumination light 35 is separated by the dichroic prism 6 into a red light 36r, a blue light 36b, and a green light 36g. The lights 36r, 36b, and 36g are modulated by the to image lights 37r, 37b, and 37g by the reflective and scattering type liquid crystal panels 7r, 7b, and 7g, respectively. After that, the image lights 37r, 37b, and 37g are photocolorsynthesized by the dichroic prism 6, thereby deriving an outgoing image light 38.

The outgoing image light 38 enters the projection lens 9 through the plane-convex lens 5 and the second aperture diaphragm 18 and is projected onto the screen (not shown).

Although the outgoing image lights 34 and 38 of different light sources pass through different aperture diaphragms, they are reflected at the same position on the liquid crystal panel and pass through the same projection lens. Consequently, they are completely overlapped each other on the screen. Although the F-number of each aperture diaphragm is F5.9, an image having the same brightness and contrast as that of the optical system which has the aperture diaphragm of F4.2 for the projection lens of F2.8 can be actually obtained.

In a dark room or the like, the first metal halide lamp 1 shown in FIG. 1 is not turned on, only the second metal halide lamp 11 is turned on, and the first aperture diaphragm 8 is closed by the shielding plate 15. In this manner, the area of the aperture diaphragm is reduced to the half and the valid F-number for the projection lens is increased from F4.2 to about F5.9, thereby improving the contrast. Such an optical system was produced experimentally. When only second lamp is turned on and the first aperture diaphragm is closed, although the brightness becomes the half as compared with a case where two lamps are turned on, the contrast is improved to about the double.

In the liquid crystal projector using the reflective and scattering type liquid crystal panel according to the invention, by using the plurality of light sources, the mirrors and aperture diaphragms are effectively arranged for the projection lens. The effective area of the aperture diaphragm for the focal plane of the projection lens becomes about 44%. Thus, the projection lens is further miniaturized and lightened and still a bright image can be obtained.

A high-quality image having high contrast which is always effective both in dark and light rooms can be provided.

(Embodiment 2)

Figure 5:
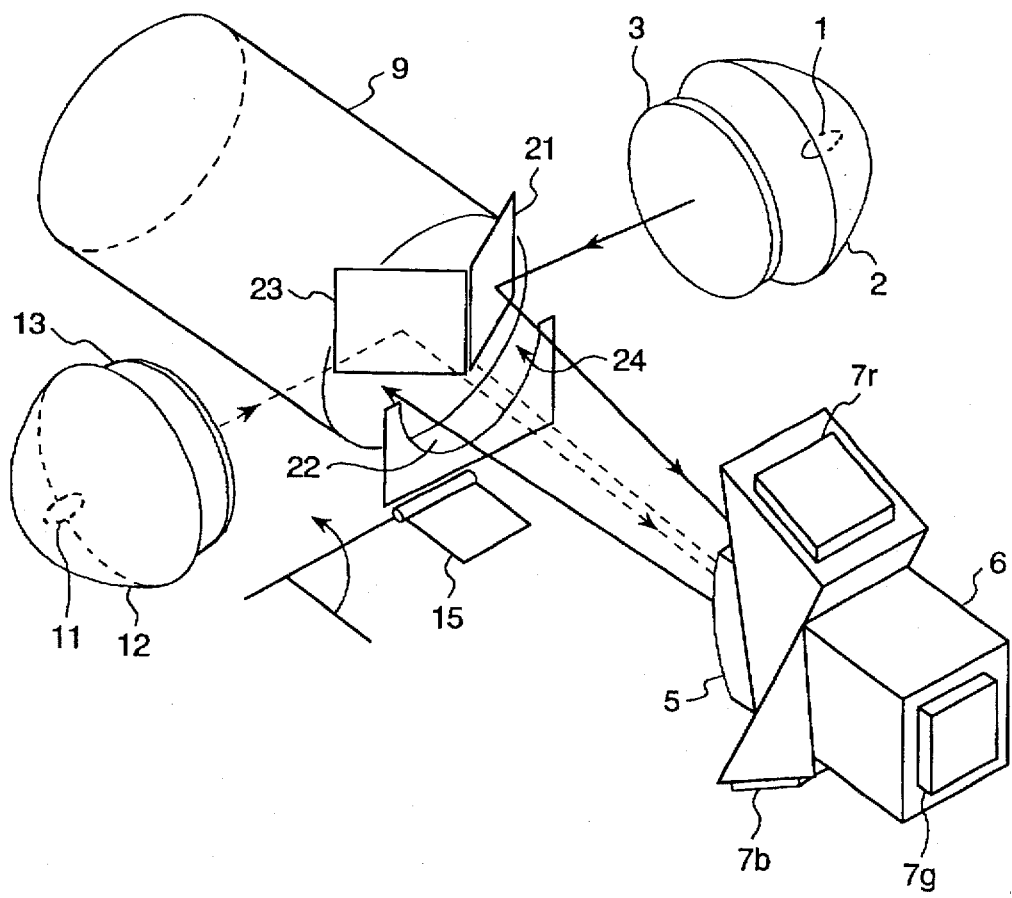
FIG. 5 is a perspective view showing the main components of an optical system of a liquid crystal projector according to a second embodiment of the invention.

The second embodiment of the invention will be described hereinbelow with reference to FIGS. 5 and 6. FIG. 5 is a perspective view showing an optical system of a liquid crystal projector of the embodiment. The optical system of the second embodiment has the same structure as that of the optical system of the first embodiment except the shape of the aperture diaphragm. Elements similar to those in the first embodiment are designated by the same reference numerals and their descriptions are omitted here.

Figure 6:
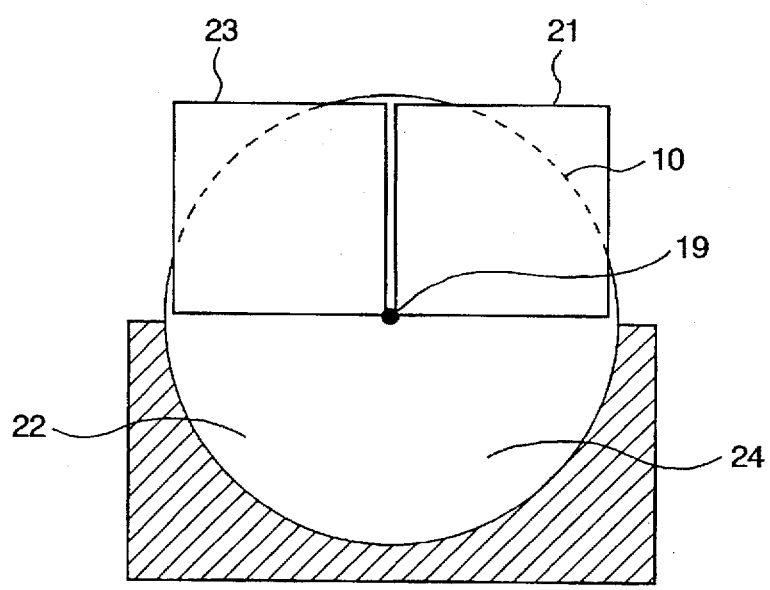
FIG. 6 is a front view of a focal plane of a projection lens of the liquid crystal projector according to the second embodiment of the invention.

FIG. 6 is a front view of the focal plane 10 of the projection lens in the embodiment. The shape of each of a first mirror 21 and a second mirror 23 is almost a square when it is seen from the front of the focal plane 10. A first aperture diaphragm 22 and a second aperture diaphragm 24 each having a shape of a quarter of a circle are adjacent each other. The effective F-number of the aperture diaphragm of a semicircle which is a shape when both of the aperture diaphragms 22 and 24 are combined is F4.0.

In the embodiment, as shown in FIG. 6, the two aperture diaphragms 22 and 24 are completely combined and have a shape of one semicircular aperture diaphragm. Attention is paid to transmission paths of illuminations lights which are not diffused but are normally reflected by the liquid crystal panel. The illumination light 31, which is irradiated from the first metal halide lamp 1 and is reflected by the mirror 21, is reflected by the liquid crystal panel. After that, the light 31 passes through only the first aperture diaphragm 22 in the semicircular aperture diaphragm. The illumination light 35, which is irradiated from the second metal halide lamp 11 and is reflected by the second mirror 23, is reflected by the liquid crystal panel. After that, the light 35 passes through only the second aperture diaphragm 24 in the semicircular aperture diaphragm. Therefore, it can be considered that the functions of the two aperture diaphragms are completely independent, and although they are adjacent each other, each of them is independent.

In a manner similar to the first embodiment, when only the second metal halide lamp 11 is turned on and the first aperture diaphragm 22 is closed by the shielding plate 15 in this embodiment, the contrast of the image is improved to about the double.

As mentioned above, as well as the liquid crystal projector of the first embodiment, the liquid crystal projector of the second embodiment has effects such that the projection lens can be miniaturized and the compact optical system by which a bright image is obtained is realized.

According to the embodiment, since the area of the aperture diaphragm is larger than that of the aperture diaphragm of the first embodiment and the difference between the aperture diaphragm and the circle is large, the contrast of the image is lower than that of the first embodiment, but the image is brighter.

(Embodiment 3)

Figure 7:
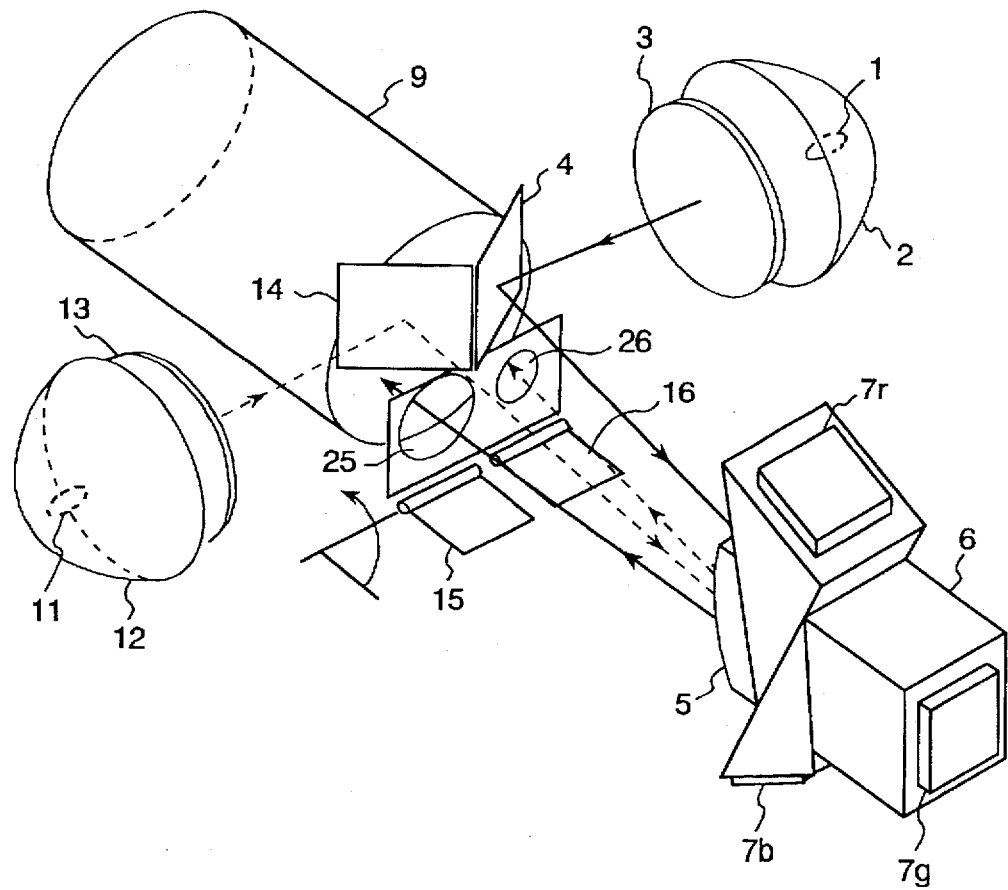
FIG. 7 is a perspective view showing the main components of an optical system of a liquid crystal projector according to a third embodiment of the invention.
Figure 8:
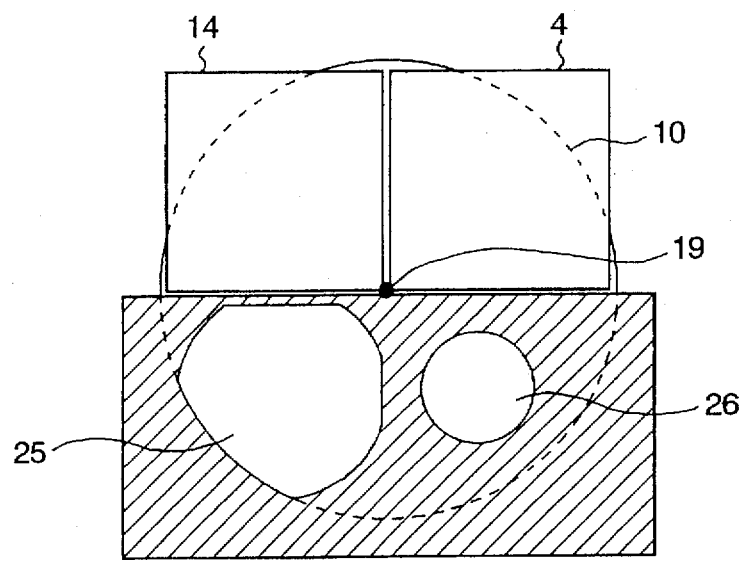
FIG. 8 is a front view of a focal plane of a projection lens of the liquid crystal projector according to the third embodiment of the invention.
Figure 9:
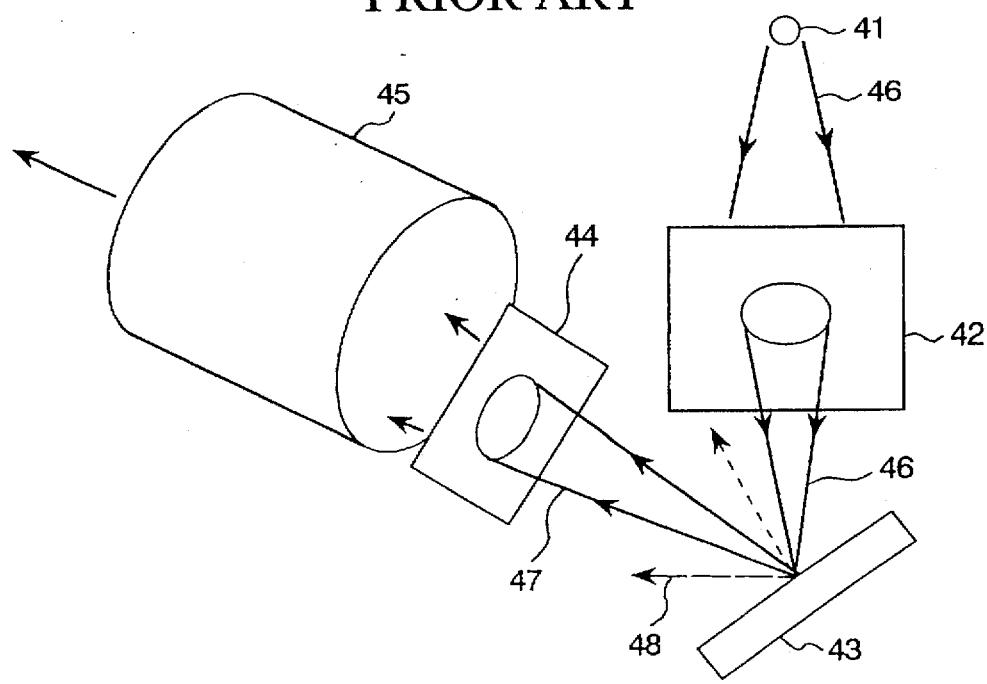
FIG. 9 is a schematic diagram showing the basic operation of a reflecting and scattering type liquid crystal projector.
Figure 10:
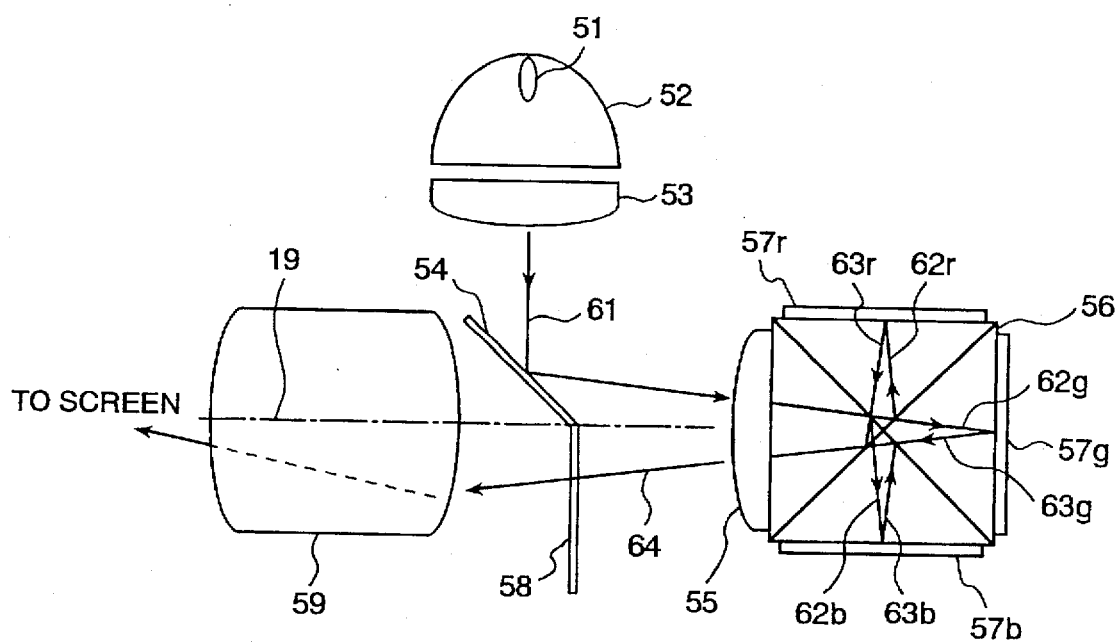
FIG. 10 is a side view showing an optical system of a conventional liquid crystal projector.
Figure 11:
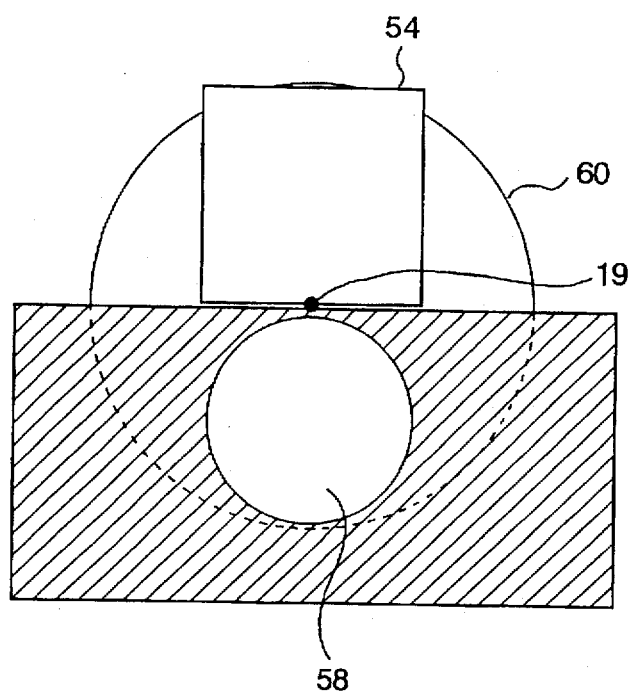
FIG. 11 is a front view of a focal plane of a projection lens of the conventional liquid crystal projector.

The third embodiment of the invention will be described hereinbelow with reference to FIGS. 7 and 8. FIG. 7 is a perspective view of an optical system of the embodiment. The structure of the optical system of the third embodiment is almost the same as that of the first embodiment except the shape of the aperture diaphragm and the number of shielding plates for aperture diaphragms (two in the third embodiment). Elements similar to those in the first embodiment are designated by the same reference numerals and their descriptions are omitted here.

As shown in FIG. 7, in the optical system of the embodiment, the size of a first aperture diaphragm 25 and that of a second aperture diaphragm 26 are different. The shape and area of the first aperture diaphragm 25 are the same as those of the first aperture diaphragm 8 of the first embodiment. The second aperture diaphragm 26 has a shape of a circle having the diameter of about 7 mm and has the almost half of the area of the first aperture diaphragm 25. The effective F-number is about F8.3.

In the optical system of the embodiment, a shielding plate 16 to close the second aperture diaphragm 26 is arranged in addition to the shielding plate 15 which closes the first aperture diaphragm 25.

In the invention, the area of the second aperture diaphragm is the half of that of the first aperture diaphragm. Consequently, when only the second metal halide lamp is turned on, the brightness of the image is reduced to the half of a case when only the first metal halide lamp is turned on. The contrast of the image is improved to about 1.7 times.

The liquid crystal projector of the embodiment can be used in three modes with respect to the brightness and contrast. The three modes are; a mode in which two lamps are turned on, a mode in which only the first lamp is turned on, and a mode in which only the second lamp is turned.

As mentioned above, in the liquid crystal projector of the third embodiment as well as the liquid crystal projector in the first embodiment, the aperture diaphragms are efficiently arranged for the focal plane of the projection lens and the projection lens can be miniaturized and lightened.

Further, since the brightness and the contrast of the image can be set in three modes in the embodiment, the fine setting according to the environment can be realized.

Although the aperture diaphragm has the circular shape or the shape obtained by notching a part of the circle in the embodiments, the area and shape of the aperture diaphragm differ according to the brightness of the image of the liquid crystal projector set, the degree of the contrast, the kind of the lamp of the light source (halogen lamp, metal halide lamp, xenon lamp, or the like), the shape of the condenser reflector, and the shape of the condenser lens. The areas and shapes of the aperture diaphragm included in the invention are not limited to those described in the embodiments, but a polygon, a corner-rounded square, a composite shape obtained by overlapping a number of circles or rectangles, or the like can be also used.

As mentioned above, according to the invention using the plurality of light sources, the projection lens can be miniaturized and lightened while keeping the sufficient brightness of the image. The entire liquid crystal projector set can be consequently miniaturized and lightened.

According to the invention using the plurality of light sources, it is unnecessary to miniaturize the light emitting unit of the lamp of the light source and the light source is long-lasting and stable.

According to the invention using the plurality of light sources, the bright image and the current-saving high-contrast image can be easily switched in the same liquid crystal projector set, so that the image according to the environment can be provided.

(Embodiment 4)

Figure 12:
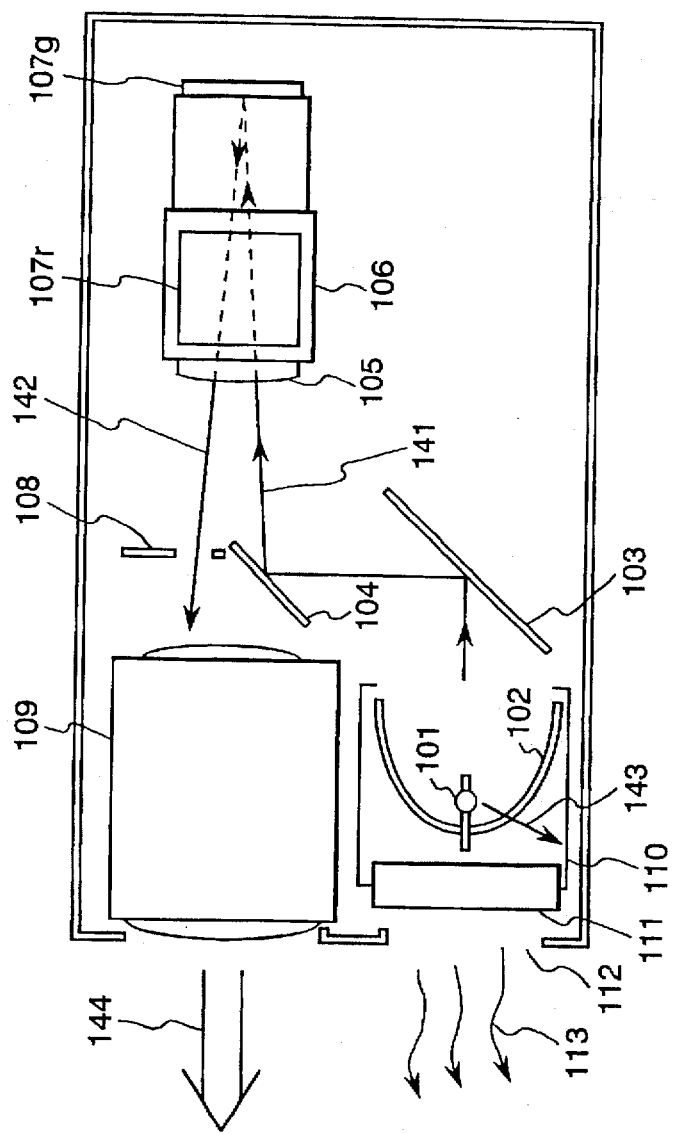
FIG. 12 is a top view of an optical system of a liquid crystal projector according to a fourth embodiment of the invention.

FIG. 12 is a top view showing the main components of an optical system of a liquid crystal projector according to the fourth embodiment of the invention. As shown in FIG. 12, a metal halide lamp 101 as a light source is arranged right at the side of a projection lens 109. An exhaust fan 111 is arranged in the same direction of the projecting direction of the light from the projection lens for a lamp house 110 and an exhaust port 112 is arranged on the front face of the set.

Figure 13:
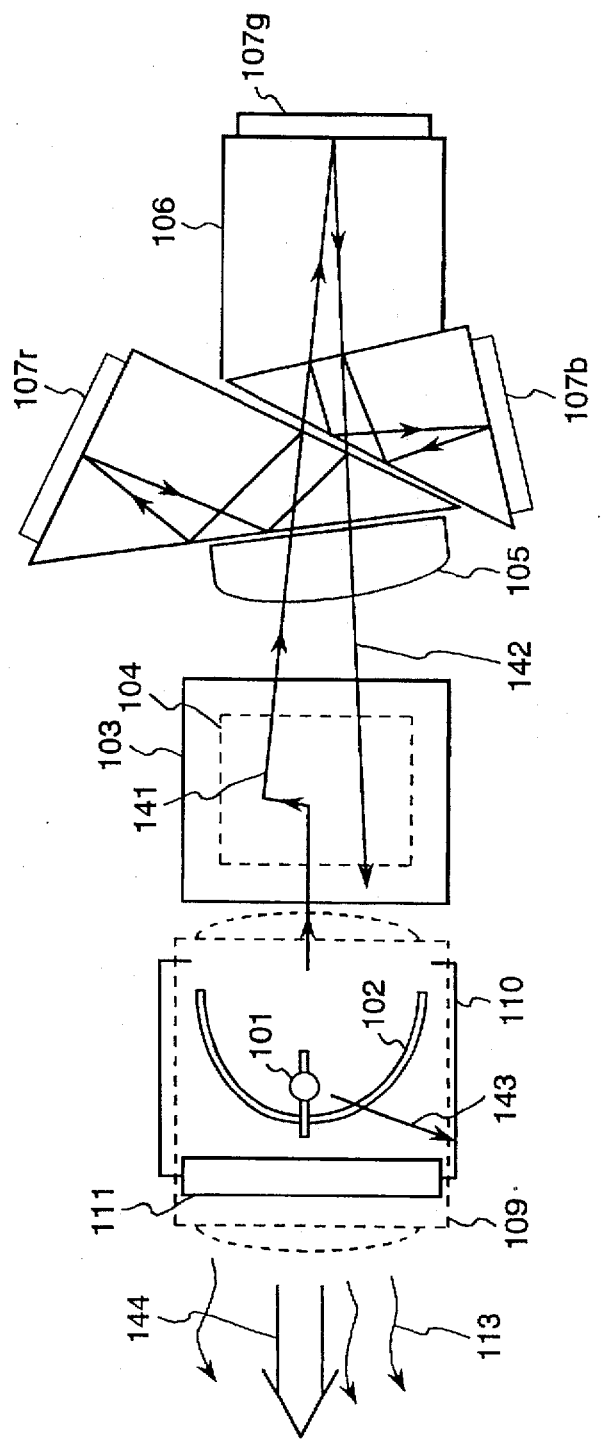
FIG. 13 is a side view of the optical system of the liquid crystal projector according to the fourth embodiment of the invention.

FIG. 13 is a side view of the optical system of the liquid crystal projector of the embodiment. In FIG. 13, the projection lens 109 and a mirror 104 which are positioned behind the lamp house 110 and a reflecting mirror 103 are shown by broken lines. As shown in FIG. 13, a dichroic prism 106 is constructed by three prisms and separates a white light emitted from the light source into the three primary colors of red, blue, and green. Reflective type liquid crystal panels 107r, 107b, and 107g are attached onto the top face, under face, and rear face of the dichroic prism 106.

The action of the liquid crystal projector of the embodiment will be described hereinbelow with reference to FIGS. 12 and 13. An illumination light 141 emitted from the metal halide lamp 101 is reflected by a condenser reflector 102 which transmits infrared and ultraviolet rays. The optical path is moved to an almost parallel one by the reflecting mirror 103 and the mirror 104. After that, the light enters the dichroic prism 106 via a plane-convex lens 105. The illumination light 141 is separated into lights of the three primary colors of red, blue, and green by the dichroic prism 106. The lights enter the reflecting type liquid crystal panels 107r, 107b, and 107g, respectively, and are modulated to an image light 142. After that, the image light 142 is reflected and photocolorsynthesized by the dichroic prism 106.

The photocolorsynthesized image light 142 passes through the plane-convex lens 105 and enters the projection lens 109 via the aperture diaphragm 107. The light becomes an outgoing image light 144 which is enlarged by the projection lens and is projected from an outgoing plane of the projection lens.

Infrared and ultraviolet rays 143 emitted from the metal halide lamp 101 transmit the condenser reflector 102. They are absorbed by the inner wall of the lamp house 110 and changed into heat. The heat stuffed in the lamp house is discharged from the exhaust port 112 by the exhaust fan 111.

Since the exhaust 113 is discharged in the almost same direction as the outgoing image light 144 in the liquid crystal projector of the embodiment, the exhaust 113 is not discharged toward the operator or observer of the image who stays by avoiding the outgoing image light 144 and the peripheral equipment.

The hot air stuffed in the lamp house 110 is promptly discharged forward and the dichroic prism 106 is arranged away from the light source. Consequently, the liquid crystal panels 107r, 107b, and 107g are not easily influenced by the heat of the light source and deterioration of the picture quality due to the heat can be avoided.

According to the liquid crystal projector in the embodiment, by arranging the exhaust port from which the heat in the lamp house is discharged on the front face of the set, the operator of the liquid crystal projector, the exhaust is not discharged toward the observer of the image, and the peripheral equipment such as an image generating source. The light source can be arranged away from the liquid crystal panel in the set. The set can be miniaturized while suppressing the deterioration of the picture quality of the liquid crystal panel caused by the increase in temperature.

(Embodiment 5)

Figure 14:
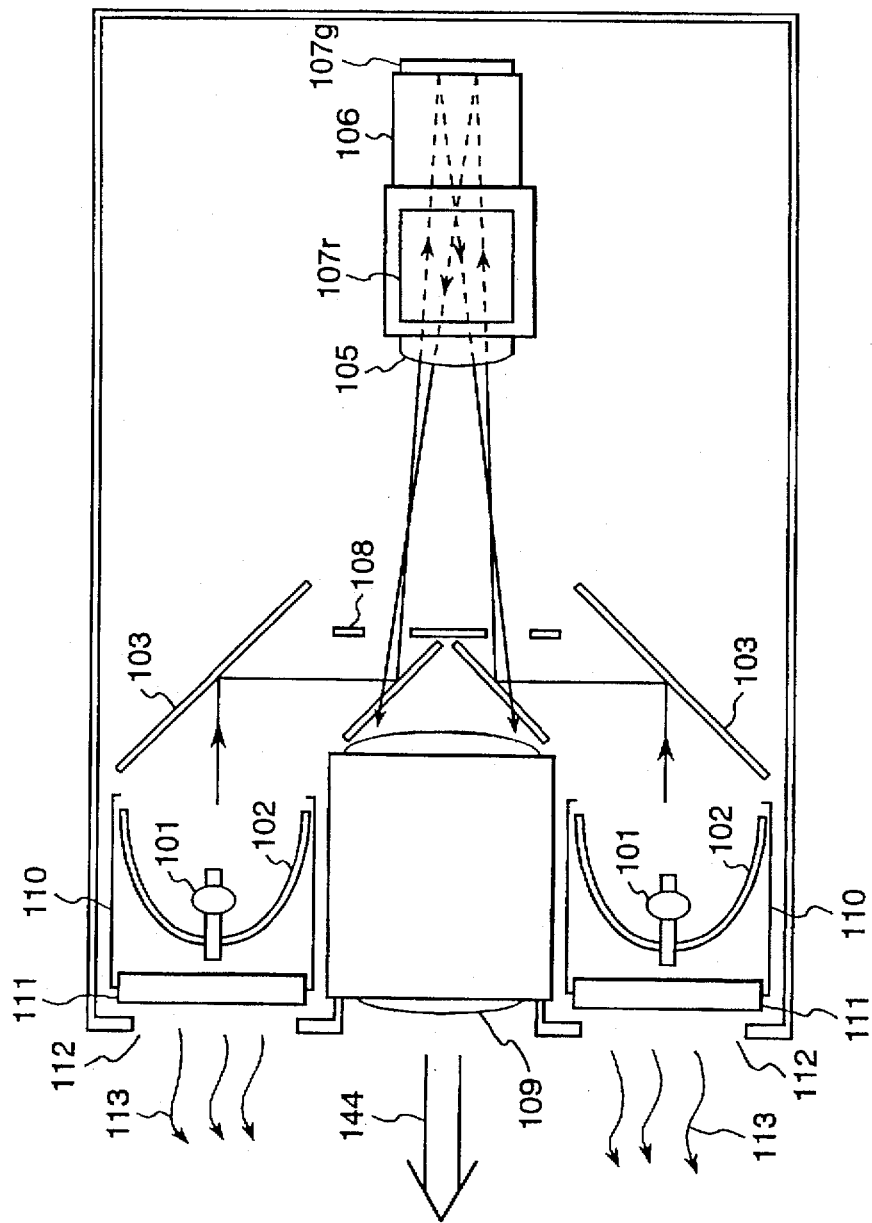
FIG. 14 is a top view of an optical system of a liquid crystal projector according to a fifth embodiment of the invention.
Figure 15:
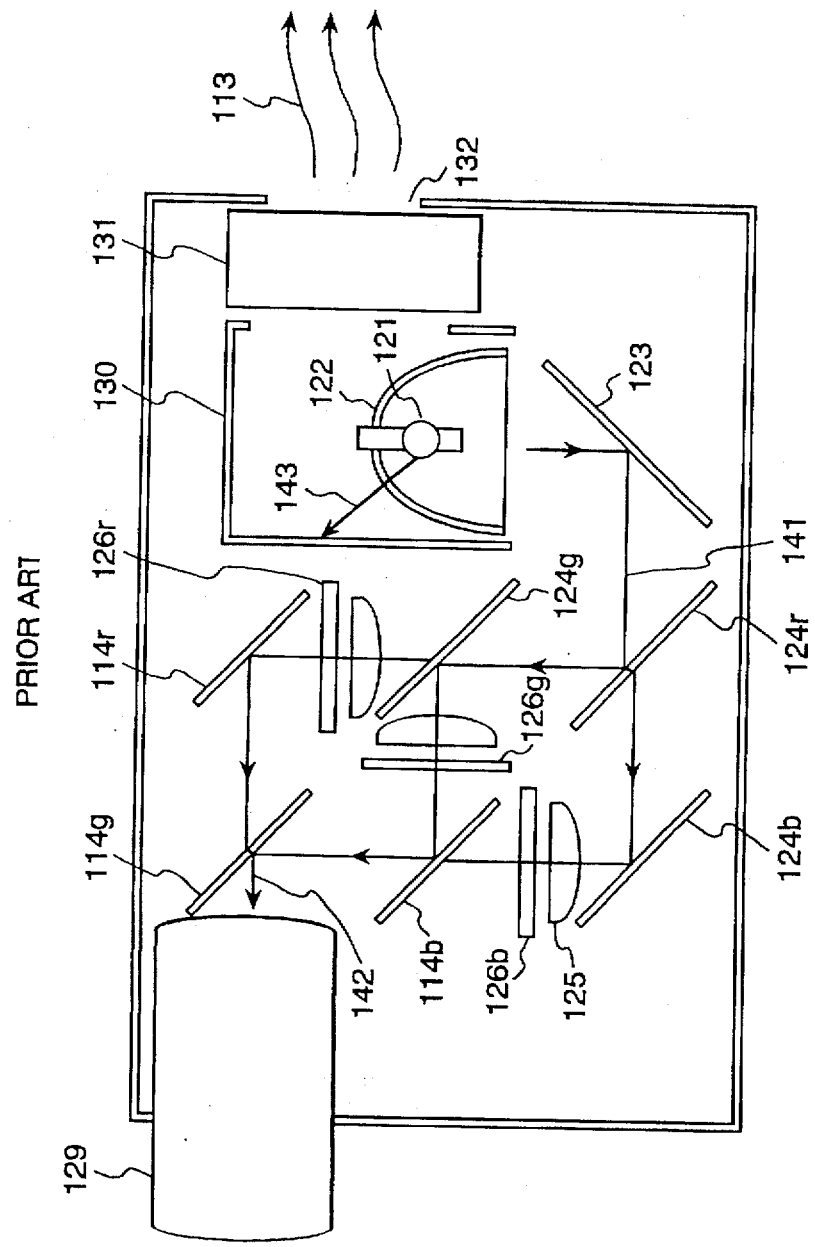
FIG. 15 is a side view of an optical system of a conventional liquid crystal projector.

The fifth embodiment of the invention will be described hereinbelow with reference to FIG. 14. FIG. 14 is a top view of an optical system of a liquid crystal projector according to the embodiment. The structure of the optical system of the embodiment is the same as that of the fourth embodiment except that two metal halide lamps are used as a light source. Elements similar to those in the fourth embodiment are designated by the same reference numerals and their descriptions are omitted here. In the embodiment as shown in FIG. 14, two metal halide lamps 101 are arranged on the right and left sides of the projection lens 109. Two exhaust ports are symmetrically arranged on the right and left sides of the projection lens 109 on the front face of the set.

In a manner similar to the fourth embodiment, the exhaust ports from which heat in lamp houses are discharged can be also arranged on the front face of the set in the fifth embodiment, so that the operator or the peripheral equipment is not exposed by the exhaust. The light source is arranged away from the liquid crystal panel in the set, so that the set can be miniaturized while suppressing the deterioration of the picture quality of the liquid crystal panel caused by the increase in temperature.

According to the invention, by using the two metal halide lamps, an image having higher brightness can be obtained.

As obviously understood from the above description, according to the liquid crystal projector of the invention in which the discharge ports are arranged on the front face of the set, the exhaust (hot air) is not discharged toward the operator of the liquid crystal projector or the observer of the image, so that the image can be pleasantly observed.

There is also an effect such that the peripheral equipment is not easily influenced by the heat.

The light source as a largest light generating unit can be arranged away from the liquid crystal panel which is easily influenced by heat in the set, so that the deterioration of the image due to increase in temperature can be suppressed. Since the influence of heat is reduced, the elements can be closely arranged. Thus, the set can be compactly produced.

(Embodiment 6)

The sixth embodiment of the invention is a liquid crystal projector comprising: a light source; a reflective type liquid crystal panel; a projection lens; an aperture diaphragm arranged in an optical path between the light source and the reflective type liquid crystal panel; and a mirror arranged in an optical path between the reflective type liquid crystal panel and the projection lens, in which an illumination light from the light source is allowed to enter the reflective type liquid crystal panel through the aperture diaphragm on the light source side and is modulated to an image light by the reflective type liquid crystal panel and is reflected, and the image light from the reflective type liquid crystal panel is allowed to enter the projection lens via the mirror on the projection lens side and is enlargedly projected onto a screen by the projection lens, wherein at least two light sources are provided.

What is claimed is:

1. A liquid crystal projector comprising: at least two lights sources; a dichroic prism; and three reflective type liquid crystal panels, in which illumination light from one or more of the light sources are allowed to enter the reflective types liquid crystal panels and are modulated to image lights by the reflective type liquid crystal panels and reflected, and the image lights from the reflective type liquid crystal panels are enlargedly projected onto a screen.

2. A liquid crystal projector comprising: a light source; a reflective type liquid crystal panel; a projection lens; a mirror arranged in an optical path between the light source and the reflective type liquid crystal panel; and an aperture diaphragm arranged in an optical path between the reflective type liquid crystal panel and the projection lens, in which an illumination light from the light source is allowed to enter the reflective type liquid crystal panel via the mirror on the light source side and is modulated to an image light by the reflective type liquid crystal panel and is reflected, and the image light from the reflective type liquid crystal panel is allowed to enter the projection lens through the aperture diaphragm on the projection lens side and is enlargedly projected onto a screen by the projection lens, wherein at least two light sources are provided.

3. The projector according to claim 2, wherein at least two mirrors are arranged.

4. The projector according to claim 3, wherein a set of the aperture diaphragm and the mirror is positioned on an oblique line, another set of the aperture diaphragm and the mirror is positioned on another oblique line, the oblique lines cross each other with respect to an optical axis of the projection lens as a center.

5. The projector according to claim 2, wherein two light sources are used, two mirrors are adjacent in the vertical or horizontal direction within a focal plane of the projection lens and occupy about half of the focal plane of the projection lens, and two aperture diaphragms are adjacently arranged in the horizontal or vertical direction on the opposite side to the mirrors with respect to the optical axis of the projection lens.

6. The projector according to claim 5, wherein adjacent portions of the adjacent aperture diaphragms are blended, thereby making a long shape in the neighboring direction.

7. The projector according to claim 5, wherein shapes of the aperture diaphragms are different.

8. The projector according to claim 6, wherein the shape of the aperture diaphragm is almost a quarter of a circle and the blended aperture diaphragms have an almost semicircular shape.

9. The projector according to claim 2, wherein only light sources of an optional number among provided light sources are turned on and a mechanism for closing the aperture diaphragm corresponding to a light source which is not turned on is provided.

10. The projector according to claim 2, wherein an exhaust port from which residual heat from the light source is discharged is positioned on the front face of the projector, on which a light-outgoing face of the projection lens is also positioned, and a discharging direction of the exhaust is almost the same as an outgoing direction of the image light.

11. The projector according to claim 10, wherein the light source is arranged almost next to the projection lens.

12. A liquid crystal projector comprising: a light source; a reflective type liquid crystal panel; a projection lens; an aperture diaphragm arranged in an optical path between the light source and the reflective type liquid crystal panel; and a mirror arranged in an optical path between the reflective type liquid crystal panel and the projection lens, in which an illumination light from the light source is allowed to enter the reflective type liquid crystal panel through the aperture diaphragm on the light source side and is modulated to an image light by the reflective type liquid crystal panel and is reflected, and the image light from the reflective type liquid crystal panel is allowed to enter the projection lens via the mirror on the projection lens side and is enlargedly projected onto a screen by the projection lens, wherein at least two light sources are provided.

13. A liquid crystal projector comprising a light source, a liquid crystal panel, and a projection lens, in which an illumination light emitted from the light source is modulated to an image light by the liquid crystal panel and the image light is enlargedly projected by the projection lens, wherein an exhaust port from which residual heat from the light source is discharged is positioned on the front face of the projector, on which a light-outgoing face of the projection lens is also arranged, and a discharging direction of the exhaust is almost the same as the outgoing direction of the image light.

14. The projector according to claim 5, wherein sizes of the aperture diaphragms are different.

* * * * *